United States Patent [19]
Takehara

[11] Patent Number: 6,101,073
[45] Date of Patent: *Aug. 8, 2000

[54] GROUND FAULT PROTECTING APPARATUS AND METHOD FOR SOLAR POWER GENERATION AND SOLAR POWER GENERATION APPARATUS USING THE APPARATUS AND METHOD

[75] Inventor: Nobuyoshi Takehara, Kyoto-fu, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/092,870

[22] Filed: Jun. 8, 1998

[30] Foreign Application Priority Data

Jun. 13, 1997 [JP] Japan ................................ 9-156745

[51] Int. Cl.$^7$ ...................................... H02H 3/00
[52] U.S. Cl. .................................. 361/42; 361/94; 363/55
[58] Field of Search ............................... 361/42, 49, 87, 361/93–94; 363/55, 95, 56–58

[56] References Cited

U.S. PATENT DOCUMENTS

| | | | |
|---|---|---|---|
| 5,214,575 | 5/1993 | Sugishima et al. | 363/37 |
| 5,268,832 | 12/1993 | Kandatsu | 363/95 |
| 5,669,987 | 9/1997 | Takehara et al. | 136/244 |
| 5,714,869 | 2/1998 | Temechika et al. | 320/30 |
| 5,751,133 | 5/1998 | Sato et al. | 320/13 |
| 5,869,956 | 2/1999 | Nagao et al. | 323/299 |

FOREIGN PATENT DOCUMENTS

| | | |
|---|---|---|
| 7-264873 | 10/1995 | Japan . |
| 8-280143 | 10/1996 | Japan . |
| 9-285015 | 10/1997 | Japan . |

*Primary Examiner*—Michael J. Sherry
*Attorney, Agent, or Firm*—Fitzpatrick, Cella, Harper & Scinto

[57] ABSTRACT

In a ground fault protecting apparatus of this invention, which protects a solar power generation apparatus from a ground fault, when a ground fault generated in a solar cell array is continuously detected for a period longer than a time T1, a gate block signal for stopping the operation of an inverter connected between the solar cell array and a load is output first. When the ground fault is continuously detected for a period longer than a time T2 (>T1), a disconnection instruction signal for disconnecting the inverter from the load is output to the disconnection unit. According to the ground fault protecting apparatus of this invention, a high ground fault detection sensitivity can be set. In addition, the solar power generation apparatus can be prevented from being unnecessarily stopped due to erroneous ground fault detection.

21 Claims, 6 Drawing Sheets

GROUND FAULT PROTECTING APPARATUS AND METHOD FOR SOLAR POWER GENERATION AND SOLAR POWER GENERATION APPARATUS USING THE APPARATUS AND METHOD

BACKGROUND OF THE INVENTION

1. Field of the Invention

The present invention relates to a ground fault protecting apparatus and method for solar power generation and to a solar power generation apparatus using the apparatus and method and, more particularly, to a ground fault protecting apparatus for protecting a solar power generation apparatus from a ground fault generated in a solar cell array and a method therefor, and to a solar power generation apparatus using the apparatus and method.

2. Description of Related Art

A solar cell array has a plurality of solar cells connected in series/parallel and is set outdoors such that each solar cell is sufficiently irradiated with solar rays. If an object, e.g., not only a metal object but also an animal or human erroneously comes into contact with the solar cell and generates a short circuit to the ground potential (ground fault), the solar power generation system incorporating the solar cell array must temporarily stop its operation, from the viewpoint of safety. This stop largely affects whether load is connected to the system.

FIG. 2 is a block diagram showing the arrangement of a solar power generation system connected to a commercial alternating current power system and having a control/protection unit as a measure against a ground fault. In FIG. 2, reference numeral 21 denotes a solar cell array; 22, an inverter; 23, a control/protection unit; 24, a disconnection unit; and 25, a commercial alternating current power system.

In the solar power generation system shown in FIG. 2, direct current power generated by the solar cell array 21 is sent to the commercial alternating current power system 25 through the inverter 22. The disconnection unit 24 having a mechanical contact is inserted between the inverter 22 and the commercial alternating current power system 25. In a system failure, a disconnection operation for electrically disconnecting the commercial alternating current power system 25 from the inverter 22 is performed, and simultaneously, a so-called gate block operation is performed to electronically turn off the switching element in the inverter 22. The control/protection unit 23 detects the states of the commercial alternating current power system 25 and the solar cell array 21 and causes the disconnection operation and the gate block operation to be performed. More specifically, upon detecting the system failure, the control/protection unit 23 sends a gate block signal to the inverter 22 and an operation instruction signal to the disconnection unit 24 to cause the inverter 22 and the disconnection unit 24 to perform the disconnection and gate block operations, respectively.

System failures include, e.g., an abnormality in the commercial alternating current power system 25 and the ground fault of the solar cell array 21. Especially, in the latter failure, i.e., the ground fault, one of the following protecting operations is performed.

(1) First protecting method (instantaneous stop type): the system is instantaneously stopped in response to detection of a ground fault.

(2) Second protecting method (delay stop type): upon detecting a ground fault, the disconnection operation is performed after a predetermined delay time. The delay time is generally set to be 0.5 sec. or less.

However, these protecting methods have the following disadvantages.

(1) The first protecting method, of instantaneously performing the disconnection operation all two readily causes erroneous operation due to noise. For this reason, the ground fault detection sensitivity cannot be very large. If such erroneous operation takes place frequently, the service life of the disconnection unit 24 is shortened, depending on the switching count of the mechanical contact of the disconnection unit 24.

(2) In the second protecting method, of delaying the disconnection operation by a predetermined time, when the delay time is short, erroneous operation occurs readily, and the ground fault detection sensitivity again must be limited, as in the first protecting method. When the delay time is set to be long, the protecting operation itself is delayed to the extent that the protection effect cannot be obtained.

SUMMARY OF THE INVENTION

It is an object of the present invention to provide a ground fault protecting apparatus capable of detecting a ground fault generated in a solar cell array at a high sensitivity and preventing any erroneous ground fault detection to prevent unnecessary stop of a solar power generation apparatus, a method therefor, and a solar power generation apparatus using the apparatus and method.

According to an aspect of the present invention, there is provided a protecting apparatus for protecting a solar power generation apparatus from a ground fault, the protecting apparatus comprising: detection means for detecting a ground fault in a solar cell array; and protection means for, when the detection means detects the ground fault, outputting an inverter stop signal for stopping an operation of an inverter connected between the solar cell array and a load and then outputting a disconnection signal for disconnecting the inverter from the load.

According to another aspect of the present invention, there is provided a protecting method for protecting a solar power generation apparatus from a ground fault comprising the steps of: detecting a ground fault in a solar cell array; upon detecting the ground fault, outputting an inverter stop signal for stopping an operation of an inverter connected between the solar cell array and a load; and after output of the inverter stop signal, outputting a disconnection signal for disconnecting the inverter from the load.

According to still another aspect of the present invention, there is provided a solar power generation apparatus comprising: a solar cell array; an inverter for converting direct current power from the solar cell array to alternating current power; a switch for connecting/disconnecting the inverter to/from a load; detection means for detecting a ground fault in the solar cell array; and protection means for, when the detection means detects the ground fault, outputting an inverter stop signal for stopping an operation of the inverter and then outputting a disconnection signal for setting the switch in an open state.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of a solar power generation system according to the present invention will be described below in detail with reference to the accompanying drawings.

First Embodiment

Arrangement

Figure 2:
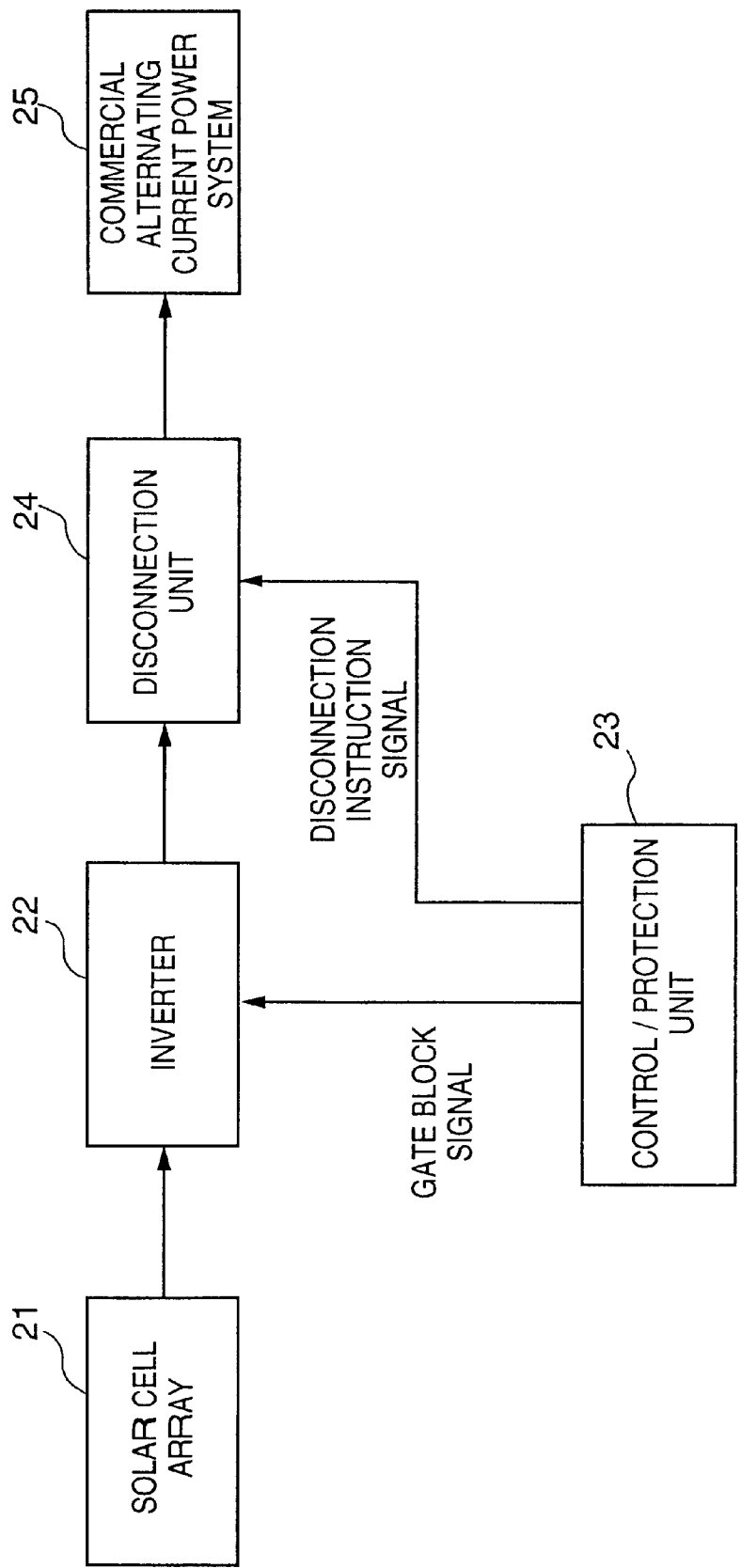
FIG. 2 is a block diagram showing the arrangement of a solar power generation system connected to a commercial alternating current power system.

A commercial alternating current power system connection type solar power generation system of the present invention has the same arrangement as that shown in the block diagram of FIG. 2. A solar cell array 21 is constituted by connecting a plurality of solar cell modules in series/parallel. The solar cell module has a photoelectric conversion member consisting of, e.g., single-crystal silicon, polysilicon, or amorphous silicon. The type of solar cells and the method of setting the solar cells are not particularly limited in practicing the embodiment.

In this embodiment, the solar cell array 21 having a rated power of 3,360 W is used. For the solar cell array 21, 14 solar cell modules (product model BS-03 available from CANON INC.) integrally formed with a roofing member are connected in series, and four modules are connected in parallel.

An inverter 22 has a function of converting direct current power generated by the solar cell array 21 into alternating current power using a full bridge circuit based on a self arc suppressing device and supplying the alternating current power to a commercial alternating current power system 25 through a disconnection unit 24. The inverter 22 incorporates a control/protection unit 23 using a microcontroller (microcomputer). The microcontroller has various protection functions and a power conversion control function as a program. The function of the ground fault protecting apparatus of the present invention is realized as some protection functions in the control/protection unit 23.

Figure 4:
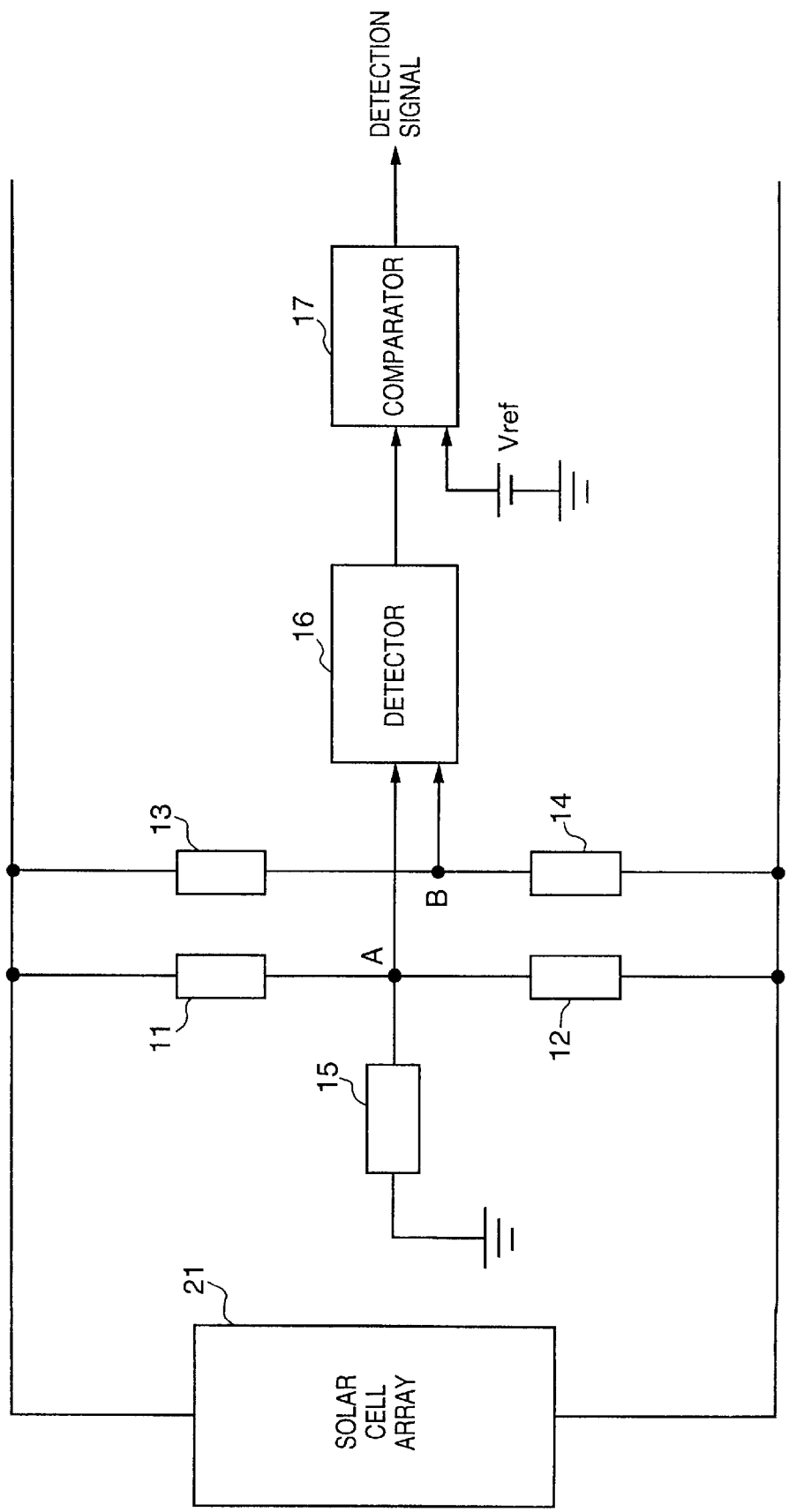
FIG. 4 is a block diagram showing the arrangement of a ground fault detector in the ground fault protecting apparatus.

FIG. 4 is a block diagram showing the arrangement of a ground fault detector constituting the control/protection unit 23. Referring to FIG. 4, reference numerals 11 to 15 denote resistors; 16, a detector for detecting the absolute value of a voltage difference; 17, a comparator for comparing the output from the detector 16 with a threshold value; and 21, the solar cell array.

This ground fault detector has a voltage divider constituted by the resistors 11 and 12 and a voltage divider constituted by the resistors 13 and 14, which are connected in parallel to the solar cell array 21. A middle point A between the resistors 11 and 12 is grounded through the resistor 15 having a high resistance. The potential difference between the middle point A and a middle point B is detected by the detector 16. When the potential difference exceeds a threshold value Vref, a detection signal representing generation of a ground fault is output from the comparator 17. Normally, resistances R11 to R14 have the same value, and at least the relationship R11:R12=R13:R14 holds.

More specifically, when a ground fault is generated in the solar cell array 21, a short circuit current flows in a short circuit consisting of a loop of solar cell array 21-resistor 11-resistor 15-solar cell array 21 or a short circuit consisting of a loop of solar cell array 21-resistor 12-resistor 15-solar cell array 21. The voltage drop in the resistor 11 or 12 increases by the short circuit current. On the other hand, the current flowing to the resistors 13 and 14 does not change. Therefore, a potential difference proportional to the magnitude of the short circuit current is generated between the middle points A and B.

In this embodiment, Vref=10 V is employed as the threshold value used to detect the potential difference between the middle points A and B. The detection voltage corresponds to about 0.5 MΩ as a dielectric resistance (short-circuit resistance), so the ground fault protecting apparatus has a considerably high sensitivity. Generally, the detection voltage is set to be 50 V or more (100 kΩ or less as a dielectric resistance), i.e., the detection sensitivity is set to be relatively low to prevent an erroneous operation (erroneous detection).

For the detector, a known method can be appropriately used, and for example, the current value difference between the positive and negative electrodes of the solar cell array 21 can be used.

The detection signal is input to the control/protection unit 23. The control/protection unit 23 often has a microcontroller, and generally, the detection signal is input to the I/O port of the microcontroller. The type of microcontroller is not particularly limited. This embodiment uses a microcontroller (product model: M7710) available from Mitsubishi Electric Corp.

Figure 1:
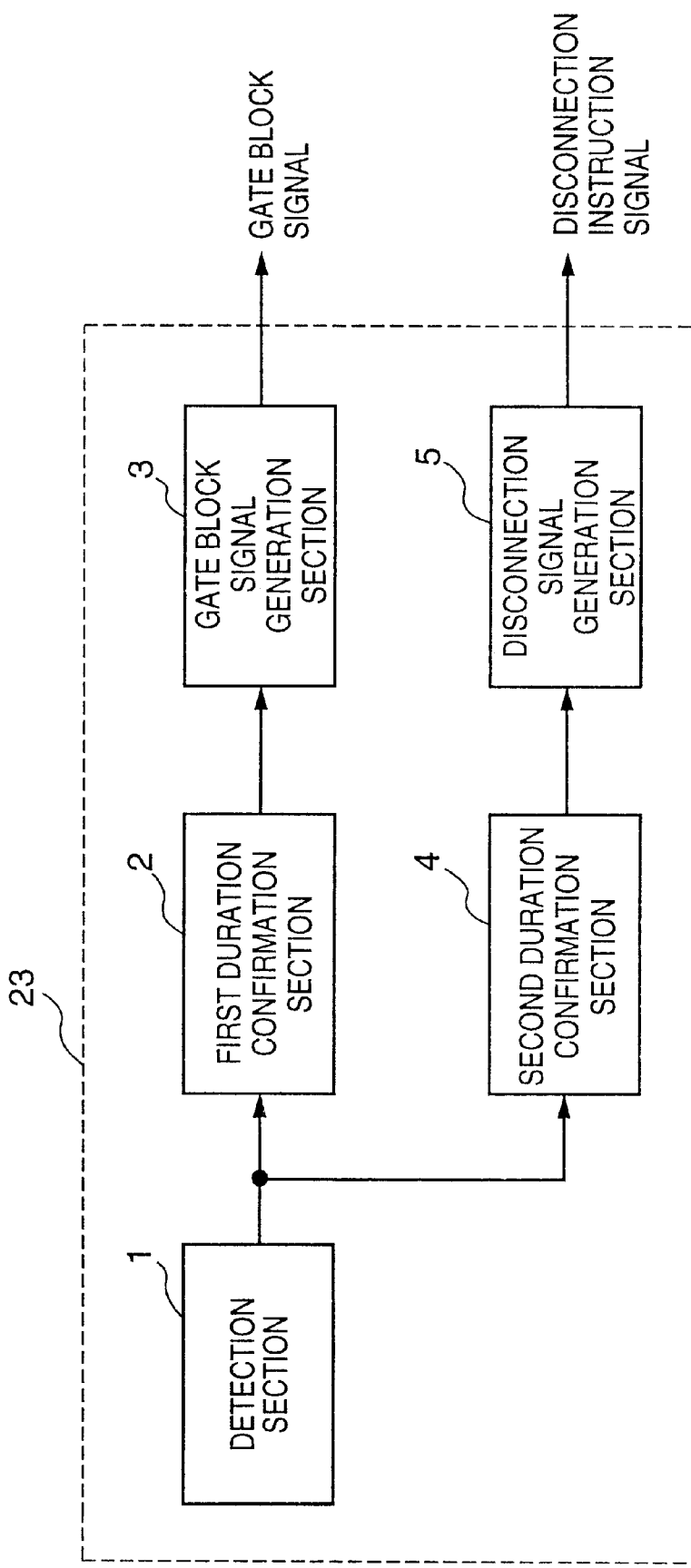
FIG. 1 is a block diagram showing the arrangement and operation of a ground fault protecting apparatus according to the present invention.

FIG. 1 is a block diagram showing the arrangement and operation of the ground fault protecting apparatus constituting the control/protection unit 23 shown in FIG. 2. Referring to FIG. 1, reference numeral 1 denotes a ground fault detection section; 2, a first duration confirmation section; 3, a gate block signal generation section; 4, a second duration confirmation section; and 5, a disconnection signal generation section. The ground fault detection section 1 corresponds to the ground fault detector shown in FIG. 4.

Operation

Figure 3:
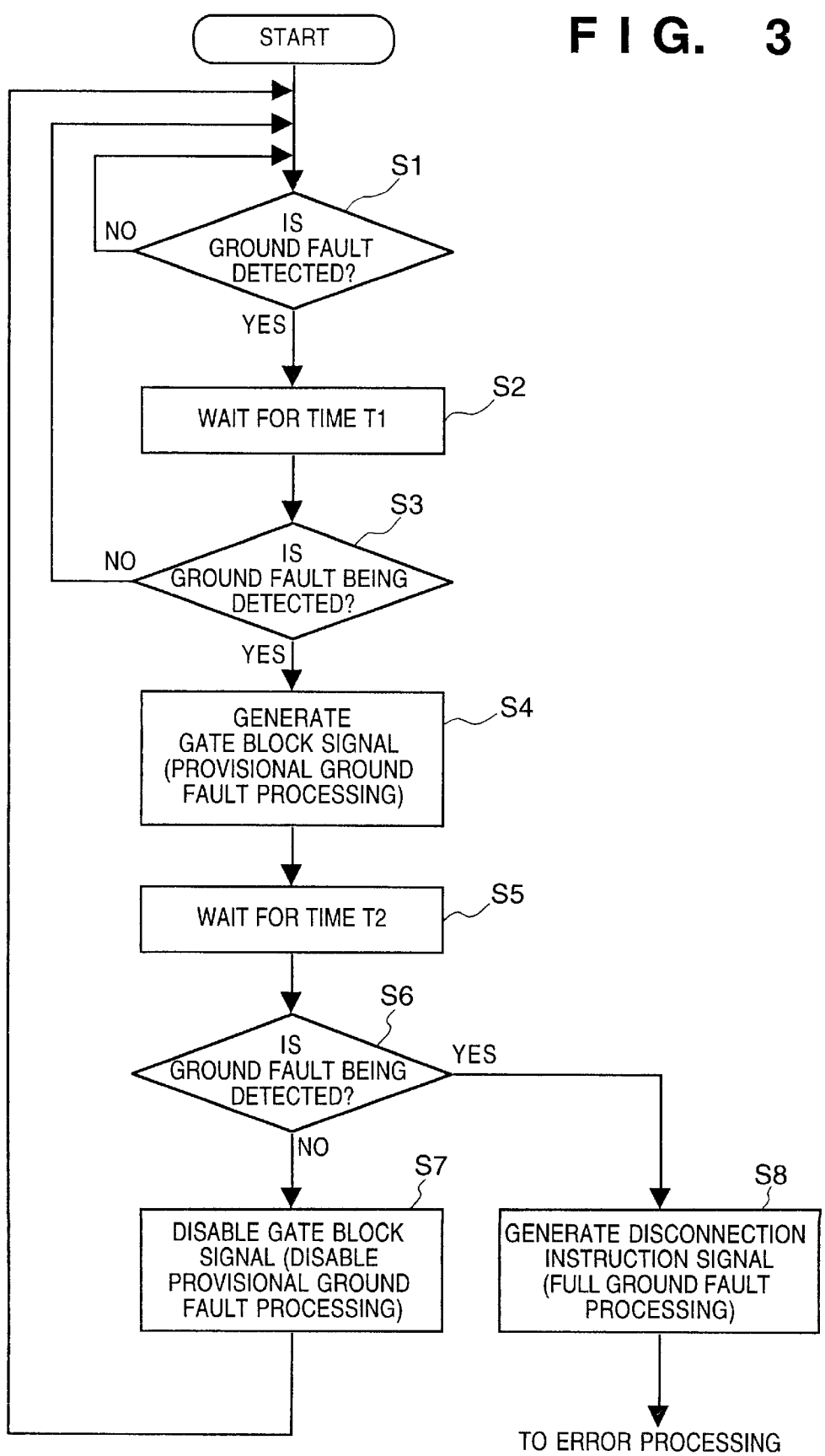
FIG. 3 is a flow chart showing a protecting operation executed by the ground fault protecting apparatus.

In the present invention, the duration of the detection signal output from the ground fault detector, i.e., the ground fault detection section 1 is checked by the first and second duration confirmation sections 2 and 4, thereby performing the protecting operation. The protecting operation itself is executed as a program of the microcontroller incorporated in the control/protection unit 23. FIG. 3 is a flow chart of the protecting operation program.

In the present invention, when a ground fault is generated in the solar cell array 21, the duration of the detection signal output from the ground fault detector is checked to determine the subsequent operation and perform protection.

The first duration confirmation section 2 determines on the basis of the detection signal output from the detection section 1 whether a ground fault has been detected (step S1). If YES in step S1, processing waits for a predetermined time T1 (step S2), and then, it is determined whether the detection signal is continuously output (step S3). When the detection signal is disabled after T1, the flow returns to step S1. If the detection signal is continuously output, the gate block signal generation section 3 is caused to output a gate block signal (step S4).

When the flow advances to step S4, after a second time T2 longer than the first time T1 has elapsed (step S5), the second duration confirmation section 4 determines whether the detection signal is continuously output (step S6). If YES in step S6, the disconnection signal generation section 5 is caused to output a disconnection instruction signal (step S8), and the flow advances to error processing. If NO in step S6, the gate block signal generation section 3 is caused to cancel the gate block signal (step S7), and the flow returns to step S1.

As a characteristic feature of the protecting method of the present invention, the protecting operation is performed in two stages, i.e., ground fault protection is performed provisionally and fully, as shown in FIG. 3.

In this embodiment, T1 is set at about 0.2 sec., and T2 at about 5 sec. The present inventor has found that, with this time setting, the protecting operation is reliably performed with sufficient practical reliability. Any particular limitations are not imposed except that the time T2 must be longer than T1. In practice, however, T1 is preferably set within the range of 0.01 to 0.5 sec., and T2 is preferably several seconds.

In this embodiment, when the ground fault (more specifically, the ground fault detection signal) continues for 0.2 sec. or more, the gate block operation of the inverter 22 is performed to stop the power conversion operation of the inverter 22. After this, when the ground fault (more specifically, the ground fault detection signal) continues for 5 sec. or more, the disconnection operation is performed for the first time. If the duration of the detection signal does not reach 5 sec., the gate block operation is canceled, and the solar power generation system returns to the normal operation state.

Since the operation of the inverter 22 is stopped at an early timing, no problems of safety are posed. In addition, since the time limit up to the disconnection operation can be set to be sufficiently long, the erroneous operation of the disconnection unit 24 can be prevented even when the ground fault detection sensitivity is increased, and the service life of the contact of the disconnection unit 24 is not adversely affected.

Figure 5:
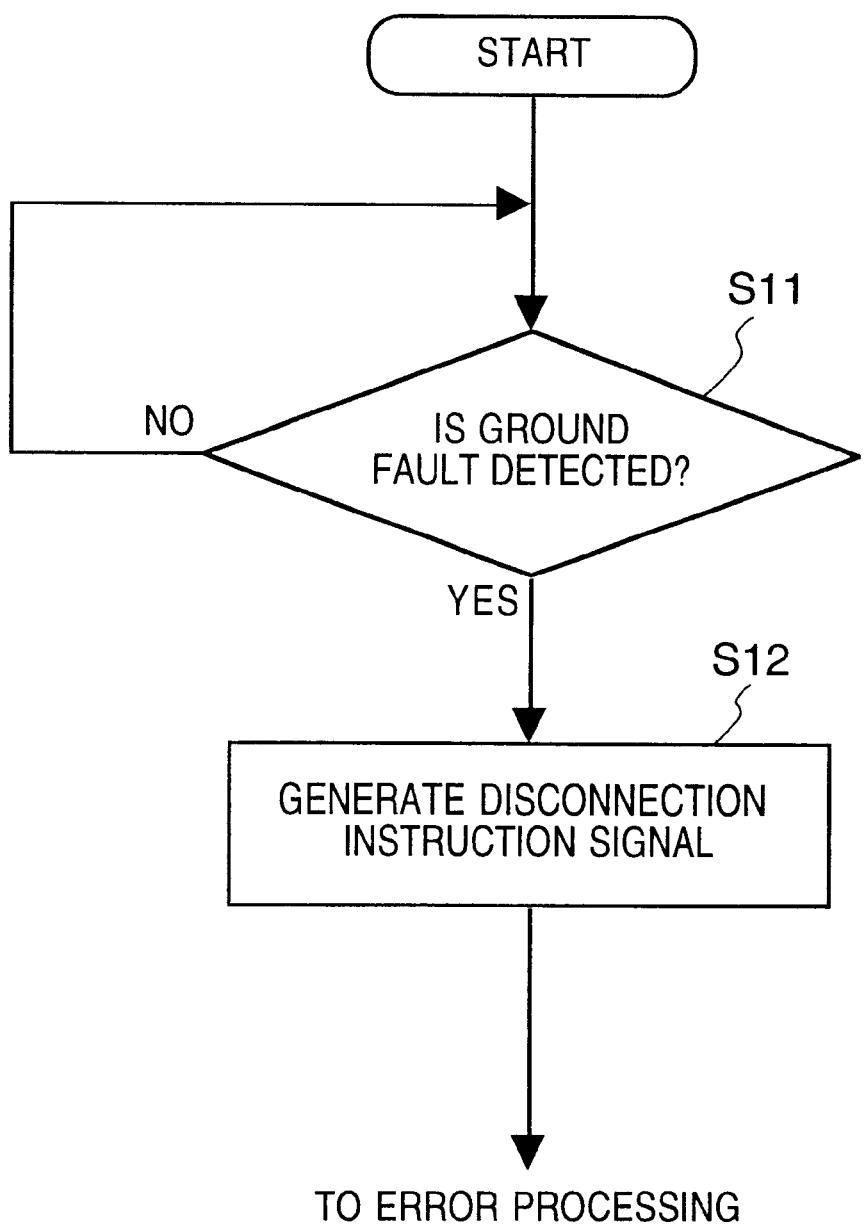
FIG. 5 is a flow chart showing the protecting operation of a general ground fault protecting apparatus.
Figure 6:
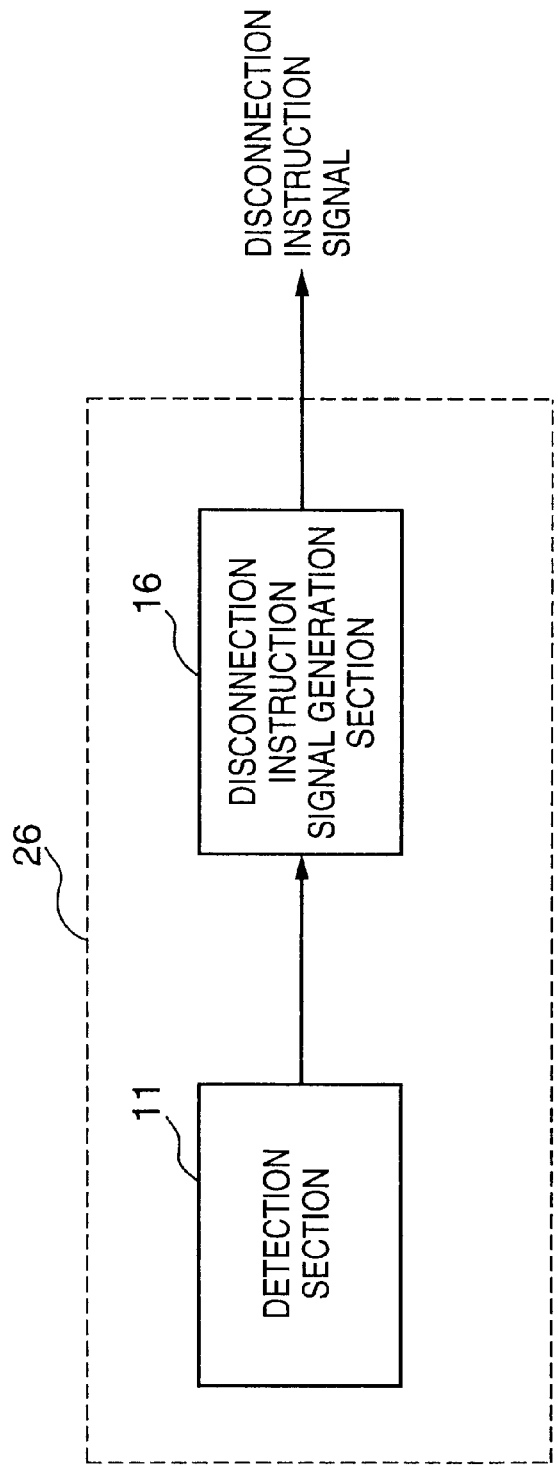
FIG. 6 is a block diagram showing the arrangement and operation of a general ground fault protecting apparatus.

To further clarify the characteristic feature of this embodiment, the operation of a general ground fault protecting apparatus will be described on the basis of FIGS. 5 and 6. FIG. 5 is a flow chart showing the operation of a general ground fault protecting apparatus. FIG. 6 is a block diagram showing the arrangement and operation of the general ground fault protecting apparatus. In FIG. 6, reference numeral 11 denotes a detection section for detecting a ground fault; 16, a generation section for generating a disconnection instruction signal and a gate block signal; and 26, a general control/protection unit.

As shown in FIG. 5, in the general ground fault protecting apparatus, when a ground fault is detected in step S11, a disconnection instruction signal is generated to operate the disconnection unit 24 (step S12). This disconnection operation is performed when a predetermined time (0.5 sec. or less) has elapsed after detection of the ground fault. However, the disconnection operation after several seconds from detection of the ground fault is not permitted from the viewpoint of safety. This is because the inverter 22 continues its operation for the several seconds. In addition, when the detection sensitivity of the detection section 11 is set to be high, the erroneous operation due to noise readily occurs. The disconnection operation is frequently performed, and the service life of the contact in the disconnection unit 24 is shortened.

Second Embodiment

In this embodiment, a fluorescent lamp (100 W, straight tube) is used as a load in place of the commercial alternating current power system 25.

In a stand-alone solar power generation system which is not connected to the commercial alternating current power system 25, many protection functions essential for an inverter connected to a commercial system can often be omitted. In this embodiment, use of such a stand-alone solar power generation system is allowed by modifying the program of the control/protection unit 23 according to the first embodiment. The detector for detecting a ground fault and the protecting method are the same as those in the first embodiment. As a solar cell array 21, a solar cell array constituted by connecting 14 polysilicon modules (available from KYOCERA Corp., LA361K54) in series is used.

When the electrode of the solar cell module forming the solar cell array 21 was brought into contact with the ground to intentionally generate a ground fault in the solar cell array 21, it was confirmed that the same protecting operation as in the first embodiment was performed.

As described above, even for the stand-alone (nonconnection type) solar power generation system, the present invention can sufficiently achieve its object.

(1) According to the solar power generation system of the above-described embodiment, erroneous operation of the ground fault protecting apparatus is decreased, and a solar power generation system with a high reliability for a long-term operation can be provided. More specifically, the following effect can be obtained. Unnecessary stoppage of the solar power generation system can be prevented while maintaining a high ground fault detection sensitivity. Since generated power is not wasted by unnecessary stoppage, the power generation efficiency of the solar power generation system can be improved.

(2) Since erroneous ground fault detection can be reduced, the number of times the disconnection unit is switched can be decreased, and the service life of the contact in the disconnection unit can be improved.

(3) Since a high ground fault detection sensitivity can be maintained, a ground fault with a small current (high ground fault resistance) can also be detected.

Therefore, the safety of the solar power generation system can be largely increased.

As many apparently widely different embodiments of the present invention can be made without departing from the spirit and scope thereof, it is to be understood that the invention is not limited to the specific embodiments thereof except as defined in the appended claims.

What is claimed is:

1. A protecting apparatus for protecting a solar power generation apparatus from a ground fault, said protecting apparatus comprising:

detection means for detecting a ground fault in a solar cell array; and protection means for, when said detection means detects the ground fault, outputting an inverter stop signal for stopping an operation of an inverter connected between the solar cell array and a load and then outputting a disconnection signal for disconnecting the inverter from the load, wherein said protection means outputs the inverter stop signal when the ground fault is detected for a period longer than a first predetermined time T1, and outputs the disconnection signal when the ground fault is detected for a period longer than a second predetermined time T2 (>T1).

2. The protecting apparatus according to claim 1, wherein, when the ground fault is not detected for the period longer than the second predetermined time T2, the inverter stop signal is disabled by said protection means.

3. The protecting apparatus according to claim 1, wherein said detection means has a first voltage divider, a second voltage divider and a comparator for comparing voltages obtained by said first and second voltage dividers.

4. The protecting apparatus according to claim 3, wherein each of said first and second voltage dividers has at least two registers connected in serial, a point of connection between the at least two registers of said first voltage divider is connected to one end of another register which is grounded at another end, and points of connections between the at least two registers of said first and second voltage dividers are connected to said comparator.

5. The protecting apparatus according to claim 1, wherein said detection means has a comparator for comparing voltages between plural electrodes of the solar cell array and a ground potential.

6. A protecting method for protecting a solar power generation apparatus from a ground fault comprising the steps of:

detecting a ground fault in a solar cell array;

upon detecting the ground fault, outputting an inverter stop signal for stopping an operation of an inverter connected between the solar cell array and a load; and after output of the inverter stop signal, outputting a disconnection signal for disconnecting the inverter from the load, wherein the inverter stop signal is output when the ground fault is detected for a period longer than a first predetermined time T1, and the disconnection signal is output when the ground fault is detected for a period longer than a second predetermined time T2 (>T1).

7. The method according to claim 6, wherein, when the ground fault is not detected for the period longer than the second predetermined time T2, the inverter stop signal is disabled.

8. A solar power generation apparatus comprising:

a solar cell array;

an inverter for converting direct current power from said solar cell array to alternating current power;

a switch for connecting/disconnecting said inverter to/from a load;

detection means for detecting a ground fault in said solar cell array; and protection means for, when said detection means detects the ground fault, outputting an inverter stop signal for stopping an operation of said inverter and then outputting a disconnection signal for setting said switch in an open state, wherein said protection means outputs the inverter stop signal when the ground fault is detected for a period longer than a first predetermined time T1, and outputs the disconnection signal when the ground fault is detected for a period longer than a second predetermined time T2 (>T1).

9. The apparatus according to claim 8, wherein, when the ground fault is not detected for the period longer than the second predetermined time T2, the inverter stop signal is disabled by said protection means.

10. The apparatus according to claim 8, wherein said detection means has a first voltage divider, a second voltage divider and a comparator for comparing voltages obtained by said first and second voltage dividers.

11. The apparatus according to claim 10, wherein each of said first and second voltage dividers has at least two registers connected in serial, a point of connection between the at least two registers of said first voltage divider is connected to one end of another register which is grounded at another end, and points of connections between the at least two registers of said first and second voltage dividers are connected to said comparator.

12. The apparatus according to claim 8, wherein said detection means has a comparator for comparing voltages between plural electrodes of the solar cell array and a ground potential.

13. An inverter apparatus for converting direct current power provided from a solar cell array to alternating current power comprising:

detection means for detecting a ground fault in the solar cell array; and protection means for, when said detection means detects the ground fault, outputting a stop signal for stopping a power conversion operation of the inverter apparatus and then outputting a disconnection signal for disconnecting the inverter apparatus from a load, wherein said protection means outputs the stop signal when the ground fault is detected for a period longer than a first predetermined time T1, and outputs the disconnection signal when the ground fault is detected for a period longer than a second predetermined time T2 (>T1).

14. The apparatus according to claim 13, wherein when the ground fault is not detected for the period longer than the second predetermined time T2, the stop signal is disabled by said protection means.

15. The apparatus according to claim 13, wherein said detection means has a comparator for comparing voltages between plural electrodes of the solar cell array and a ground potential.

16. A computer program product comprising a computer readable medium having computer program code, for protecting a solar power generation apparatus from a ground fault in a solar battery array, said product comprising:

detection process procedure code for detecting a ground fault in the solar battery array;

first output process procedure code for, upon detecting the ground fault, outputting an inverter stop signal for stopping an operation of an inverter connected between the solar battery array and a load; and second output process procedure code for, after output of the inverter stop signal, outputting a disconnection signal for disconnecting the inverter from the load, wherein the inverter stop signal is outputted when the ground fault is detected for a period longer than a first predetermined time T1, and the disconnection signal is outputted when the ground fault is detected for a period longer than a second predetermined time T2 (>T1).

17. An inverter apparatus for converting direct current power provided from a solar cell array to alternating current power comprising:

detection means for detecting a ground fault in the solar cell array, wherein said detection means has a first voltage divider, a second voltage divider and a comparator for comparing voltages obtained by said first and second voltage dividers; and protection means for, when said detection means detects the ground fault, outputting a stop signal for stopping a power conversion operation of the inverter apparatus and then outputting a disconnection signal for disconnecting the inverter apparatus from a load.

18. The apparatus according to claim 17, wherein each of said first and second voltage dividers has at least two registers connected in serial, a point of connection between the at least two registers of said first voltage divider is connected to one end of another register which is grounded at another end, and points of connections between the at least two registers of said first and second voltage dividers are connected to said comparator.

19. A protecting apparatus for protecting a solar power generation apparatus, said protecting apparatus comprising:

detection means for detecting whether an output of a solar cell array is a ground fault or not; and protection means for outputting an inverter stop signal for stopping an operation of an inverter provided between the solar cell array and a load and then outputting a disconnection signal for disconnecting electrical connection between the inverter and the load based on a detection result of said detection means, wherein said protection means outputs the inverter stop signal when the ground fault is detected for a period longer than a first predetermined time T1, and outputs the disconnection signal when the ground fault is detected for a period longer than a second predetermined time T2, (>T1).

20. A solar power generation apparatus comprising:

a solar cell array;

an inverter provided between the solar cell array and a load;

a switch provided between the inverter and the load for switching electrical connection between the inverter and the load;

detection means for detecting whether an output of the solar cell array is a ground fault or not within an area between the solar cell array and the inverter; and protection means for outputting an inverter stop signal for stopping an operation of the inverter and then outputting an open signal for opening the switch based on a detection result of said detection means, wherein said protection means outputs the inverter stop signal when the ground fault is detected for a period longer than a first predetermined time T1, and outputs the open signal when the ground fault is detected for a period longer than a second predetermined time T2 (>T1).

21. A computer program product comprising a computer readable medium having computer program code, for protecting a solar power generation apparatus, said product comprising:

detection process procedure code for detecting whether an output of a solar cell array is a ground fault or not within an area between the solar cell array and an inverter which is provided between the solar cell array and a load;

first output process procedure code for outputting an inverter stop signal for stopping an operation of the inverter based on a detection result of said detection process; and second output process procedure code for, after output of the inverter stop signal, outputting an open signal for opening a switch provided between the inverter and the load based on the detection result, wherein the inverter stop signal is outputted when the ground fault is detected for a period longer than a first predetermined time T1, and the open signal is outputted when the ground fault is detected for a period longer than a second predetermined time T2 (>T1).

* * * * *

UNITED STATES PATENT AND TRADEMARK OFFICE
CERTIFICATE OF CORRECTION

PATENT NO. : 6,101,073

DATED : August 8, 2000

INVENTOR(S): NOBUYOSHI TAKEHARA

It is certified that error appears in the above-identified patent and that said Letters Patent is hereby corrected as shown below:

COLUMN 1:
Line 10, "generation" should read --generation,--.

COLUMN 2:
Line 6, "two" should read --too--.

Signed and Sealed this

Twenty-fourth Day of April, 2001

Attest:

NICHOLAS P. GODICI

Attesting Officer     Acting Director of the United States Patent and Trademark Office